Figure 21:
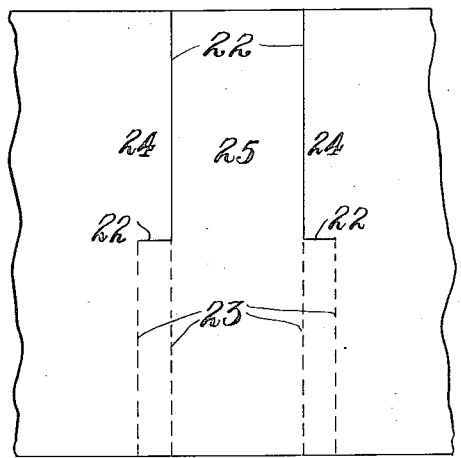

S. M. FORD.
SHINGLE.
APPLICATION FILED JAN. 10, 1916.
1,213,472.
Patented Jan. 23, 1917.
3 SHEETS—SHEET 1.
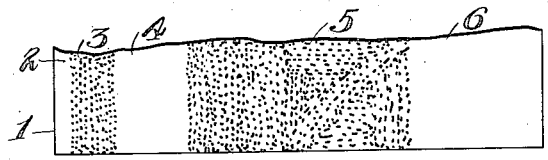
Fig. 1.
Fig. 2.
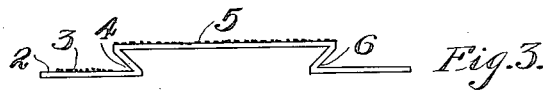
Fig. 3.
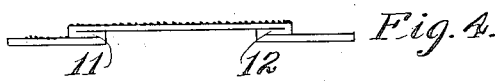
Fig. 4.
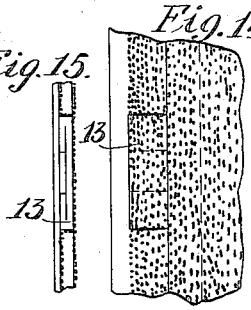
Fig. 14.
Fig. 15.
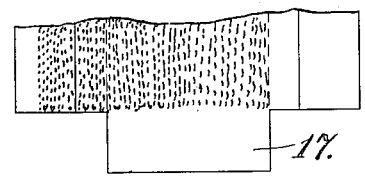
Fig. 5.
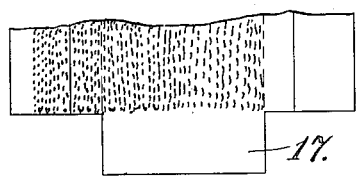
Fig. 6.
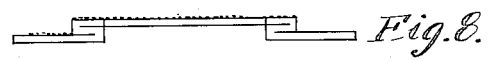
Fig. 7.
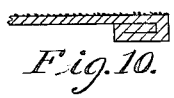
Fig. 10.
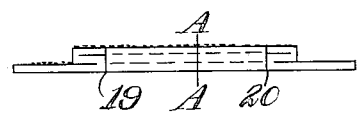
Fig. 8.
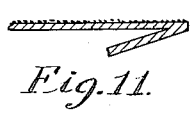
Fig. 11.
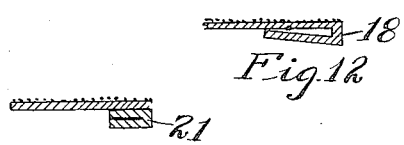
Fig. 9.
Fig. 13.
Fig. 12.
Inventor:
Silas M. Ford.
by C. D. Enochs
Attorney.

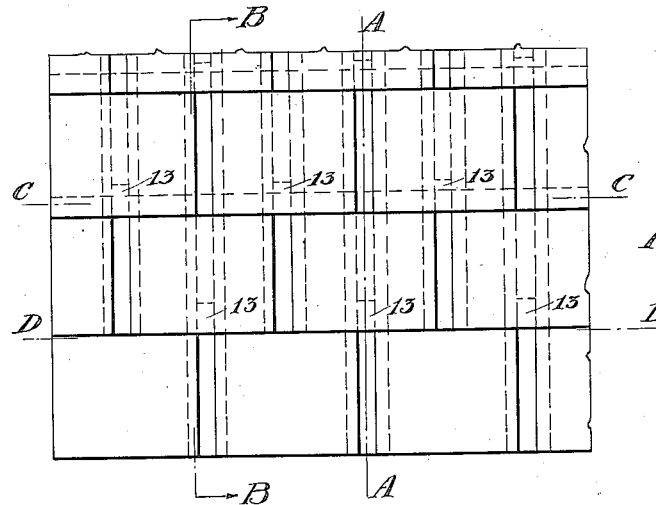
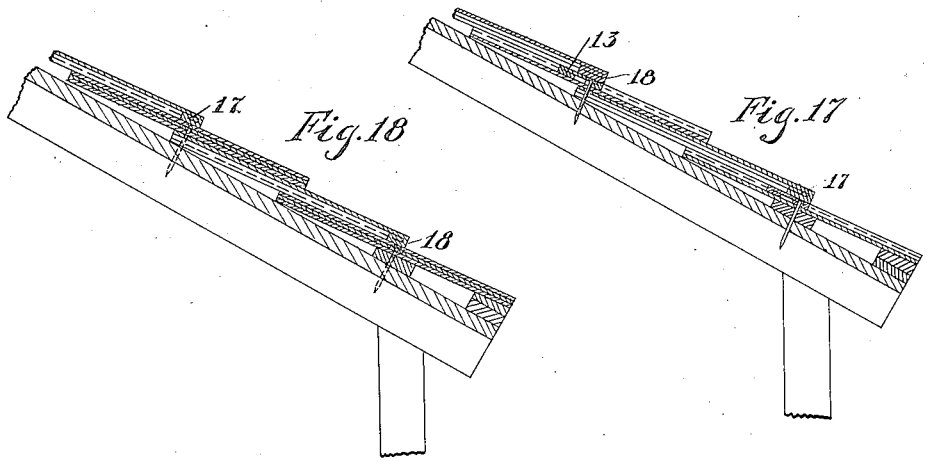
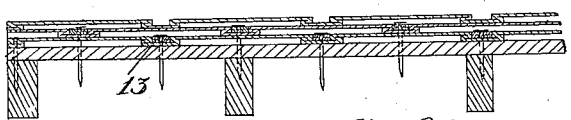

S. M. FORD.
SHINGLE.
APPLICATION FILED JAN. 10, 1916.

1,213,472.

Patented Jan. 23, 1917.
3 SHEETS—SHEET 3.

Inventor:
Silas M. Ford.
by C. D. Enochs
Attorney.

UNITED STATES PATENT OFFICE.

SILAS M. FORD, OF ST. PAUL, MINNESOTA.

SHINGLE.

1,213,472.  Specification of Letters Patent.  Patented Jan. 23, 1917.

Application filed January 10, 1916. Serial No. 71,312.

*To all whom it may concern:*

Be it known that I, SILAS M. FORD, a citizen of the United States, residing at St. Paul, in the county of Ramsey and State of Minnesota, have invented certain new and useful Improvements in Shingles, of which the following is a specification.

This invention relates to shingles, and particularly that form of shingles made from more or less flexible material, and the improvements disclosed herein relate both to individual or unit shingles and to shingle strips.

One object of my invention is to provide stiffening means running the length of the shingle for holding the shingle edge flat to the roof and giving it strength and stiffness to resist any lifting effect of the wind.

Another object of my invention is to provide a gutter in the shingle, whether an individual shingle or shingle strip is used, in such manner that the gutter is a part of the shingle itself, so there are no openings through which water or wind might pass.

Another object of my invention is to provide a block for the gutter in the shingle that may be used as a gage line for laying the shingles, will serve as an absolute dam against water blown up the gutter, and will serve as a nailing point so as to give additional thickness for nailing through, thus increasing the resistance of the shingle against being blown off by the wind.

Another object of my invention is to provide a nailing point in individual shingles, so that the individual shingle may be securely and firmly held with a single nail instead of requiring two or more, as is usually the custom.

Another object of my invention is to provide in a shingle strip an expansion joint that will take up the contraction or expansion of the shingle strip, so that the total result of contraction or expansion will be confined to each individual shingle in the strip.

Another object of my invention is to provide a shingle of such construction that when laid with substantially half the shingle exposed to the weather, there will be always at least two thicknesses of shingle at every point, so that at the weakest point of the shingle there will be two thicknesses of the material of which the shingle is made.

Another object of my invention is to provide means for forming a gutter in the shingle in such manner that it will be rigid, and the sides or edges of the gutter be bound down so that the gutter is a part of a unit shingle.

Another object of my invention is to provide an extension that may be turned back under the body of the shingle at its lower end in such manner that when the shingles are laid, this turned back extension blocks any wind or rain from being driven up in under the shingle proper, and prevents the shingle from buckling or warping.

Another object of my invention is to provide in a shingle a construction that will give the lower edge of the shingle the heavy strong appearance of a common wooden shingle.

Another object of my invention is to provide in a shingle means for preventing the shingle, after being laid, warping from a flat surface lying tightly against the roof.

Another object of my invention is to provide in a shingle or shingle strip two reinforced bends or folds at right angles to each other, so that one bend will be across the grain of the material from which the shingle is made, and the other bend will be with the grain, or both bends may be formed at an angle with the grain of the material.

Another object of my invention is to provide in unit shingles or shingle strips constructional features, so that all the advantages of smooth surface coated stock, weather-proofing qualities, or the weather resisting flaked mineral or gravel surface sometimes used with shingles of this nature may be employed with the greatest possible effect, and the lowest possible cost.

While in the drawings I show the weather-proofing coating and the flaked mineral or gravel surface coating on one side of the shingle only, it is evident that these additional coatings may also be put upon the lower side of the shingle, and thus the shingle built up similarly on each side.

With these and incidental objects in view the invention consists of certain novel features of construction and combination of parts, the essential elements of which are set forth in appended claims and a preferred form of embodiment of which is hereinafter described with reference to the drawings which accompany and form a part of this specification.

Figure 22:
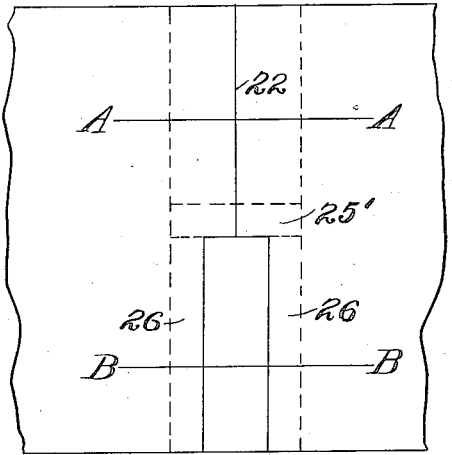
Figure 23:
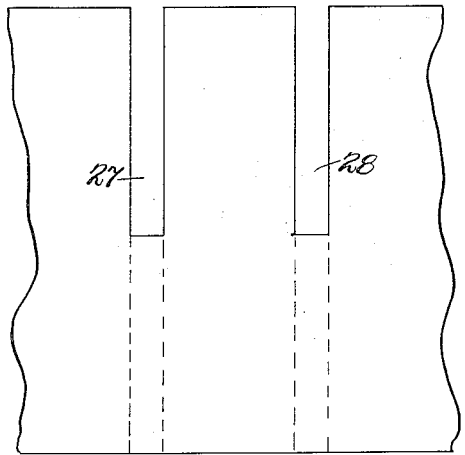
Figure 24:
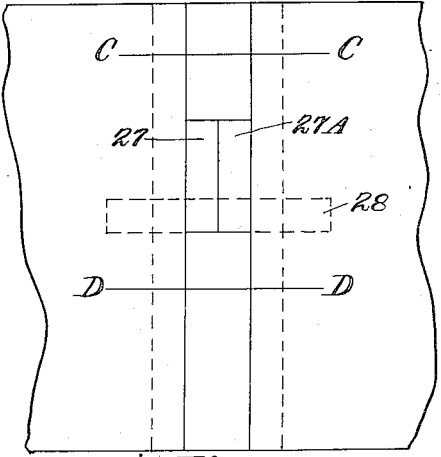
Figure 25:
Figure 27:
Figure 26:
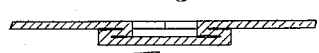
Figure 28:

In the drawings Figure 1 discloses a plan view of a sheet of suitable roofing material before it is bent to form my improved shingle. Fig. 2 is an end view of the sheet shown in Fig. 1, in which the folds are started. Fig. 3 is an end view of the same sheet with the folds carried nearer completion, and Fig. 4 is an end view of the sheet with the folds completed. Fig. 5 is an end view of a similar shingle with a modified surfacing at the folds. Fig. 6 is an end view of a shingle formed with a square bend instead of the folds disclosed in previous figures. Fig. 7 is a plan view of a portion of a shingle before folding. Fig. 8 is an end view of the shingle shown in Fig. 7, with the folds in Figs. 2, 3 and 4 completed. Fig. 9 is an end view of the same shingle with the extension 17, Fig. 7, folded down to stiffen the shingle transversely. Fig. 10 is a sectional detail of a modification of the manner of folding the extension. Fig. 11 is a sectional detail showing a further modification of the manner of folding the extension. Fig. 12 is a sectional detail of a further modification of the manner of folding the extension, and Fig. 13 is a sectional detail showing a still further manner of providing a heavy appearance for the butt of the shingle. Fig. 14 is a plan view showing the manner in which I apply a block to the gutter, and Fig. 15 is a side view of the same. Fig. 16 is a plan view of a portion of a roof laid with my improved shingle or shingle strip. Fig. 17 is a section taken on the line A A, Fig. 16. Fig. 18 is a section taken on the line B B, Fig. 16, looking in the direction of the arrows, and Fig. 19 is a section taken on the line C C, Fig. 16. Fig. 20 is a section taken on the line D D, Fig. 16. Fig. 21 is a plan view of a portion of a shingle strip showing my preferred construction before the folds are made to form the gutter. Fig. 22 shows this construction with the folds completed. Fig. 23 is a plan view of a portion of a shingle strip before the folds are made in forming an alternate construction, and Fig. 24 is a plan view of the same portion of the shingle strip shown with the folds completed. Fig. 25 is a section taken on the line A A, Fig. 22, and Fig. 26 is a section taken on the line B B, Fig. 22. Fig. 27 is a section taken on the line C C, Fig. 24, and Fig. 28 is a section taken on the line D D, Fig. 24.

The sheet of roofing material shown in Fig. 1 may be felt, paper or any suitable material, preferably impregnated with some form of water-proofing compound and having surfaces 2, 4 and 6 covered with a smooth weather-proofing material, and surfaces 3 and 5 covered with a flaked mineral or gravel material, the under side of the sheet preferably having the compound used to water-proof material, only as it would naturally remain on the surface of the sheet during the process of manufacturing.

Folds are started by bending at the points 7, 8, 9 and 10, Fig. 2, and is shown nearly completed in Fig. 3, and as finally completed in Fig. 4. As shown in Fig. 4 the Z shaped folds are pressed tightly together, and as the surfaces 4 and 6, Fig. 3, are coated with the weather-proofing compound, which is of a tacky nature, these surfaces are incorporated together when the folds are pressed together tightly, as shown in Fig. 4. The under side of the shingle material is also brought together at the fold and incorporated more or less, as the waterproofing compound is itself of a tacky nature.

In Fig. 5 the shingle is shown formed from a sheet of material covered entirely with a flaked mineral or gravel, in which case the only incorporation would be between the joints formed in the folds between the portions of the surface of the back of the sheet.

In Fig. 6 is shown a modification wherein the fold is omitted and a square bend is employed in place of the fold shown in previous figures.

The folds as shown in the drawings, as already described, stiffen the shingle longitudinally, and to give a similar stiffening transversely, I leave an extension 17, Fig. 7, at the lower end of the shingle between the longitudinal folds, already described, and bend this extension downwardly at an angle of 90 degrees, and then backwardly as shown in Figs. 9 and 12, and as alternate means I bend it as shown in either Figs. 10 or 11. As a modification, I may shear off this extension 17, fold it tightly together and glue the stiffened bead so formed to the lower side of the shingle, as shown in Fig. 13, any of the methods serving to stiffen the shingle transversely, and it will be noted in Fig. 9 that the sides of this extension 17 after being folded come into close contact with the folds forming the gutters at 19 and 20, thus stiffening the shingle at the extremities of the extension, as well as through the extension itself.

The drawings already described illustrate the method of forming longitudinal and transverse stiffening means, and these methods are applied either in single shingles or in shingle strips.

My preferred construction is a shingle strip, as shown in Figs. 21, 22, 25 and 26. In Fig. 21 the shingle strip is sheared along the lines 22, and the folds as already described are made along the dotted lines 23, so that when the shingle is folded it presents the appearance, as shown in Fig. 22. It is apparent that by the position of the longitudinal shearing lines 22, I may either have the side extension 24 meet, as shown at 28, Fig. 22, or I may have them lap. For instance, if the distance between lines 23, Fig. 1, is 1½ inches, and the distance between adjacent lines 22 and 23, is ½ inch, the extensions 24 will lap one over the other when folded as shown in Fig. 22, and with the tongue 25 preserve a uniform thickness throughout the length of the shingles, and close the gutter without the use of a special block.

Where I do not lap the extensions 24 one over the other, but have them meet as shown in Fig. 22, I lay a strip 25' between the extensions 24 and the tongue 25, thus blocking the gutter at its upper end. It is evident that with the extensions 24 meeting at 22, and with the strip 25' inserted, as shown in Fig. 22, I have three thicknesses of material in the lower half of the shingle and two in the upper half of the shingle, as shown in Figs. 25 and 26.

As an alternate construction for a shingle strip, I use the construction shown in Fig. 23, in which a strip of material is cut out at 27, and also at 28, the fold to form the gutter is made as already described, the piece cut at 27 is cut into two halves, placed as shown at 27 and 27ᴬ, Fig. 24, and the piece cut from 28 placed transversely, as shown in Fig. 24, thus blocking the gutter and giving the same tapered effect, as better shown in Figs. 27 and 28.

In individual shingles, or where I make shingle strips in the same manner as individual shingles are made, as heretofore described, I place a block 13, Figs. 14 and 15, preferably formed from a piece of the same material, so as to block the gutter in shingle strips, or to position the piece so that the gutter will be blocked in individual shingles when the shingles are laid upon the roof. This is better shown in the plan view in Fig. 16 taken in conjunction with the sectional views shown in Figs. 17, 18, 19 and 20, which fully identify the position of the block from all directions. It will be noted that the block 13 serves as a guide for placing the row of shingles next above and also serves as a nailing point, allowing a minimum of four thicknesses of the material for the nail to penetrate, as plainly shown in Figs. 17 and 18.

Either in individual shingles or in shingle strips, the folds serve as extension joints, taking up the expansion or contraction in the folds, and thus confining the expansion and contraction to a shingle unit, and preventing the roof from contracting or expanding as a whole.

While I have described my invention and illustrated it in particular designs, I do not wish it understood that I limit myself to these constructions, as the application of my invention may be varied in many ways within the scope of the following claims.

Claims:

1. In a shingle strip the combination of shingle units formed from said strip, a gutter integral with said shingle units formed from said strip, said gutter running longitudinally with said shingle units thus formed, and a block positioned in said gutter intermediate of the ends of said gutter.

2. In a shingle strip the combination of a tongue formed by longitudinally shearing along two parallel adjacent lines in the upper portion of said strip, two extensions formed adjacent to said tongue, one on either side thereof by a shearing cut at right angles to said longitudinal shearing cuts, a gutter in the lower portion of said shingle strip formed by folding into a substantially tight box plait the lower portion of said shingle strip below said right angle shearing cuts, said extensions being lapped over the tongue in the upper portion of said shingle strip.

3. In a shingle strip the combination of a tongue formed by longitudinally shearing along two parallel adjacent lines in the upper portion of said strip, two extensions formed adjacent to said tongue, one on either side thereof by a shearing cut at right angles to said longitudinal shearing cuts, a gutter in the lower portion of said shingle strip formed by folding into a substantially tight box plait the lower portion of said shingle strip below said right angle shearing cuts, the extension being lapped over the tongue in the upper portion of said shingle strip, and a block positioned at the upper end of said gutter, extending transversely across the upper end of said gutter.

4. As an article of manufacture a shingle formed of fibrous water-proofed material having a fold running longitudinally thereof with the surfaces forming said fold incorporated together, and a transverse fold at the butt end thereof abutting said longitudinal fold.

5. As an article of manufacture a shingle formed of fibrous water-proofed material having folds running longitudinally at either side of said shingle, and a transverse fold at the butt end thereof, said transverse fold abutting said folds at either side.

6. As an article of manufacture a shingle formed of fibrous water-proofed material having a fold running longitudinally thereof at each side, forming a gutter wall when said shingles are laid upon a roof in shingle fashion, and a block of water-proofed material positioned against said gutter wall and the bottom of said gutter intermediate of the ends of said shingle, and incorporated to said gutter wall and the bottom of said gutter.

7. In shingle strips the combination of stiffening folds in said shingles running lengthwise thereof, a gutter formed between the sides of said shingles by said stiffening folds and a block positioned in said gutter and incorporated to the bottom and walls of said gutter.

8. As an article of manufacture a shingle strip formed of fibrous water-proofed material having a double fold or plait running longitudinally thereof, the surfaces of said double fold being incorporated together forming a gutter between two horizontally adjacent shingles.

9. As an article of manufacture a shingle having longitudinal stiffening means and a transverse stiffening fold at the butt end thereof formed by bending an extension at the lower end of said shingle at right angles thereto and bending the right angle extension so formed back toward the body of the shingle so as to present a flat surface at the lower end of said shingle.

10. In a shingle strip the combination of shingle units and gutters between said units, said gutters being formed by bending said shingle strip into a substantially tight box plait.

11. In a shingle strip the combination of two extensions formed by a longitudinal shearing cut and two transverse shearing cuts at right angles to said longitudinal cut and intermediate of the ends of said shingle, a gutter in the lower portion of said shingle strip formed by forming into a substantially tight box plait the lower portion of said shingle strip below said right angle shearing cuts, said extensions being lapped one above the other in the upper portion of said shingle strip.

SILAS M. FORD.